United States Patent Office 3,288,121
Patented Nov. 29, 1966

3,288,121
ROTARY PISTON ENGINE
René Linder, % Ceriani, 29 Via San Pietro, Saronno, Italy
Filed Mar. 7, 1966, Ser. No. 532,168
Claims priority, application Switzerland, Aug. 30, 1962,
10,330/62
12 Claims. (Cl. 123—8)

This application is a continuation-in-part of my previous application, Serial No. 304,083, filed August 23, 1963, now Patent No. 3,246,835.

Rotary piston machines are already known, which include an elongated piston, defined by two arcs of a circle, facing each other and wherein the piston is provided with a central opening the centre of which registers with the centre of symmetry of the piston. The inner peripheral surface of the opening in the piston rolls over the periphery of a wheel which is carried on a shaft extending through the centre of symmetry of the machine. In these machines, the centre of the piston and the centre of symmetry of the machine do not register with each other. The piston moves in a chamber with three arcs defined by three cylinders in permanent contact with the periphery of the piston the centres of said cylinders coinciding with the apices of an equilateral triangle the centre of which lies at the centre of symmetry of the machine.

In such rotary piston engines, the piston executes, while in constant contact with the three above-mentioned cylinders forming the fluidtight separation between the three elementary chambers of the casing, a rotary wobbling motion, in a manner such that, during the rotation of the piston round its centre, said centre of the piston moves simultaneously round the centre of symmetry of the machine, while its distance with reference thereto varies periodically.

Such rotary piston machines can serve either as pumps or as compressors, if the shaft carrying the central wheel is driven and thereby said wheel shifts the piston, so as to confer to it the above described wobbling motion, or else, they may act as internal combustion engines in which case the shaft carrying the central wheel serves as an output shaft.

In order to produce the above mentioned wobbling motion of the piston, it is known to mount the central wheel with a certain eccentricity on the central shaft in a manner such that the spacing between the rotary axis and the centre of the wheel compensates exactly the periodical modifications in the distances assumed by the piston centre upon rotation round the centre of symmetry of the machine.

Hitherto, the central wheel was constituted by a toothed wheel which meshed with a corresponding inner series of teeth along the opening provided in the piston. Because of the use of a toothed wheel carried eccentrically by the central shaft, it is necessary to select a pitch diameter of the toothed wheel exactly equal to the radius of the pitch radius of the inner series of teeth of the piston. As a result, the speed reducing ratio for the angular speeds between the piston and the toothed wheel is equal to 1.4 which is quite satisfactory for many applications, in particular for compressors. However, it may mean a certain restriction in matching predetermined conditions for operation. This speed reducing ratio of 1:4 for the rotary speeds of the piston and of the toothed wheel, on the one hand, and the diameter which is to be chosen comparatively small, in the case of certain sizes of machine, for the central wheel, and, therefore for the driving and driven shafts, are in fact unfavorable for various applications and limits the forces which can be transmitted through the central toothed wheel and the central shaft.

Furthermore, it has appeared that to obtain a perfectly uniform contact at three points between the periphery of the piston and the three cylindrical surfaces of the casing, for any desired position whatever of the piston, a slight adjustment of the peripheral surface of the piston is advantageous while, however, the general shape of the piston formed by the two diametrically opposed arcs of a circle needs to be modified.

The invention has for its main object to provide an improved rotary piston machine of the type disclosed, wherein, simultaneously, the uniformity of contact between the piston and the wall of the casing and consequently the fluidtightness of the machine chamber are improved, and wherein the diameter of the central wheel may be selected as desired with reference to the diameter of the opening in the piston.

It is thus possible, with predetermined machine sizes and, according to the applications of the machine and to the magnitude of the forces to be applied or to be transmitted, to select a sufficiently strong central wheel and a sufficiently strong central shaft whereby, simultaneously, the speed reducing ratio between the central wheel and the piston, may be selected so as to be smaller than 4.1 instead of having to choose of necessity; as hitherto, a diameter ratio between the opening in the piston and the central wheel equal to 2:1. With the claimed device it is possible to obtain a diameter ratio of 3:2 or 4:3. Correspondingly, the speed reducing ratio is reduced.

Since the geometric shape of the rotary piston machine according to the invention is, in principle, independent of the shape of the three arcs of the cylinders forming the chamber and since the perfect operation of the machine depends only on the maintenance of the three points of contact providing fluidtightness between the periphery of the piston and the three above-mentioned cylinder surfaces, it is unnecessary, in the following disclosure of the invention, to give further detail as to the shape of the arcs of the cylinders of the chamber. Obviously, one will select normally for obtaining an optimum compression in the different elementary chambers, cylinder arcs along the chamber which are such that their radius corresponds to the radius of the piston arcs while the piston always fills completely in practice an elementary chamber through one of its arcuate surfaces whenever the longitudinal axis of the piston registers with the bisecting line of the arc of a cylinder wall.

It is possible, when using the machine as an internal combustion engine, to design otherwise the elementary chamber walls which form the internal combustion chambers.

In order to simplify the disclosure, the expression "cylinder" will be selected hereinafter for those three bodies the cylindrical surface of which are in permanent contacting relationship with the periphery of the piston and merge constantly into the two walls, adjacent at any moment thereto, of the cylindrical chambers of the machine.

In order to allow hereinafter disclosing with suitable formulae the general geometrical structure of the rotary piston machine, the following designations will be used, which are also used herein in the description of the invention.

O—the centre of symmetry of the machine
G—the centre of symmetry of the piston
S1, S2, S3—the centres, lying at the apices of an equilateral triangle, of the cylinder surfaces of the casing tangent to the piston periphery.
S—the radius of said cylinders
r—the pitch radius of the central wheel
R—the radius of the piston arcs A1, B1—the central points of the two piston arcs X—the deviation outwardly and inwardly of the path followed by G round O from a true circular path, designated in known machines as eccentricity.

The fundamental geometric structure of the known rotary piston machines is essentially given by the following equations:

$$OS1=OS2=OS3=a=7.94r$$
$$R+s=a-r$$
radius of the piston opening $2r$
$$x=0.0161$$

The radius vector of the piston's movement is the result of the simultaneous superimposition of three components:

(1) The true rotation of the piston around its axis of symmetry G;

(2) Simultaneously, a movement whereby the centre of the piston 6 moves around the centre of symmetry of the stationary engine O;

(3) A path described by 6 around O which path is not an exact circle but deviates from an exact circle inwardly and outwardly by a maximum distance equal to $x$.

For a preferred embodiment, the rotary piston machine according to the invention has no compulsory relationship between the diameters of the central wheel and the central opening in the piston. In other words, since the average spacing between the centre of the piston G and the centre of symmetry O of the machine is thus not necessarily equal to the radius $r$ of the pitch circle of the wheel, the average spacing $OG=e$ between the centre of the piston and the centre of symmetry of the machine must be considered.

The present rotary piston machine has an elongated piston with two diametrically opposed arcs of a circle of a radius R, which piston is provided with a central opening the centre of which registers with the centre of symmetry G of the piston, a wheel of a radius $r$, of which the periphery runs over the inner periphery of the opening of the piston, said wheel being carried by a shaft extending through the centre of symmetry O of the machine, while G and O do not coincide; three cylinders tangent with the piston periphery and having a radius $s$ the centres of which S1, S2, S3 register with the apices of an equilateral triangle having its centre at O, while the piston which is in constant tangent relationship with the three above-mentioned cylinders, executes a rotary wobbling motion, in a manner such that during the rotation of the piston round its centre G, said piston centre moves round the centre of symmetry O of the machine with a spacing with reference thereto varying periodically between $e+x$ and $e-x$, $e$ designating the average spacing between O and G. Viewed against the described machine, the invention is characterized by the fact that the wheel is carried concentrically by the shaft passing through the axis of symmetry O and that, in order to take into account the above-mentioned shifting of the movement of the centre of the piston with reference to an accurate circular path, the inner periphery of the opening in the piston differs correspondingly from an accurate cylindrical surface.

While retaining the general geometrical structure of known rotary piston machines, the following equations are applicable for the rotary piston machine according to the invention, as defined essentially by the average spacing $$OS1=OS2=OS3=a=7.64e$$
$$R+s=a-e$$

Spacing between the centre of the arcuate line defining the piston and the centre of symmetry of the piston $A_1G=B_1G=2e+x$.

The diameter of the opening in the piston in the longitudinal direction of the piston is selected according to the invention as equal to $2(r+e+x)$, in the transverse direction of the piston as equal to $2(r+e+x)$ and along a diagonal at 45° as equal to $(2+e)$.

The accurate shape of the inner peripheral surface of the opening in the piston in the intermediate areas is obtained suitably by a graph formed by a succession of points in a manner such that, with a uniform contact through three points between the peripheral surface of the piston and the three cylinders, the radial force appearing during the rolling of the wheel over the inner peripheral surface of the opening in the piston is uniform and constant throughout all positions of the piston.

Under the best conditions, this requirement may be satisfied by selecting $x$ as equal to $0.016e$.

The improved geometrical shape of the periphery of the piston is obtained in accordance with a further feature of the invention as a consequence of the following considerations: the piston should, for those three positions for which the longitudinal axis of the piston (passing exactly through points A1, B1), coincide with a bisecting line of the above-mentioned triangle, and, be in contact, on the one hand, with the apex of one of its arcuate outlines with one cylinder and, on the other hand, through two points of its other arcuate outline with the other two cylinders. Thus, the length of the arcuate outline of the piston, is in fact defined by these last-mentioned points of contact.

For any other position whatever of the piston, there is always one point at which one arcuate outline of the piston must be in contact with one cylinder and one point of the other arcuate outline must be in contact with the other cylinder, while the curves connecting the ends of the two arcuate outlines together and forming the lateral sides of the periphery of the piston, differ from an accurate straight line and are designed in a manner such that the third cylinder is always in contact with one point on said curves.

In practice, this curve interconnecting the two arcuate outline sections of the piston, is defined point by point, graphically or by calculation, which, as will be disclosed hereinafter, leads to no difficulty. It is found that the above-mentioned alterations of these curves with reference to an accurate straight line, are extremely small and are at a maximum only equal to about $2x$; that is only about 0.032 of the selected average distance $OG=e$.

The invention will now be disclosed with reference to the drawings showing on the one hand, diagrammatic illustrations and, on the other hand, further details of practical embodiments of rotary piston machines.

FIGURES 1 to 3 are three diagrammatic illustrations of a first embodiment, wherein the central wheel is carried concentrically by the central shaft and is in contact with the inner wall of the opening in the piston, which opening differs somewhat from an accurate circle.

The radius $r$ of the central wheel is selected as $r=3e$.

In these diagrammatic drawings, the three arcs of the cylindrical chamber wall are accurate arcs of a circle, of which the radius corresponds to the radius R of the arcuate outline sections of the piston.

The structural details and also the valves, input and output ports and ignition plugs arranged in the walls of the cylindrical chamber, when the machine serves as an engine are not illustrated.

Figure 7:
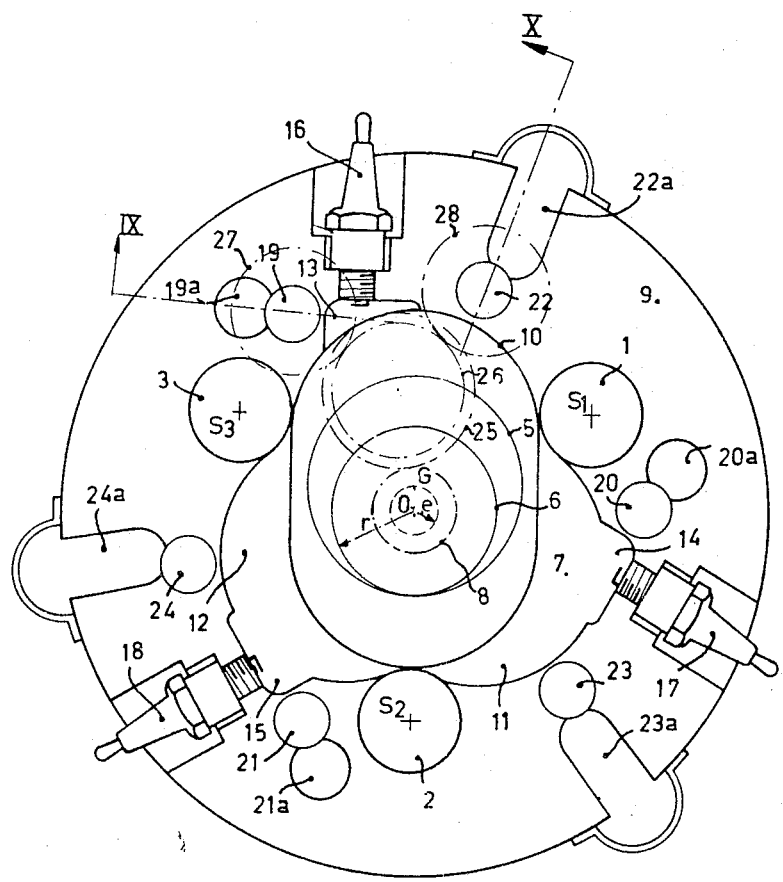
Figure 8:
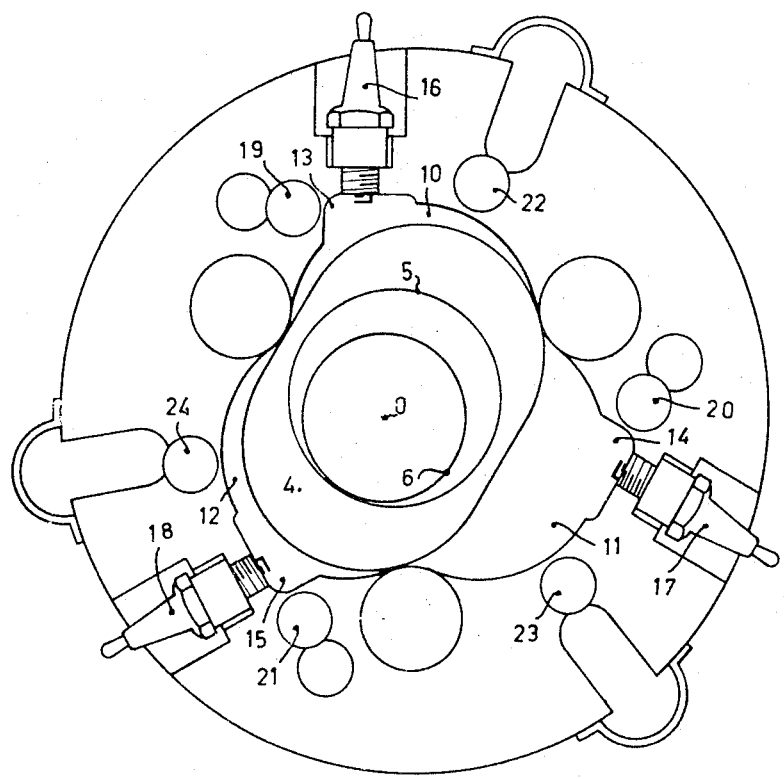

FIGS. 7 and 8 show an example of an application of a rotary piston machine according to the invention as an internal combustion engine, said internal combustion engine being illustrated for two different positions of the piston.

Figure 9:
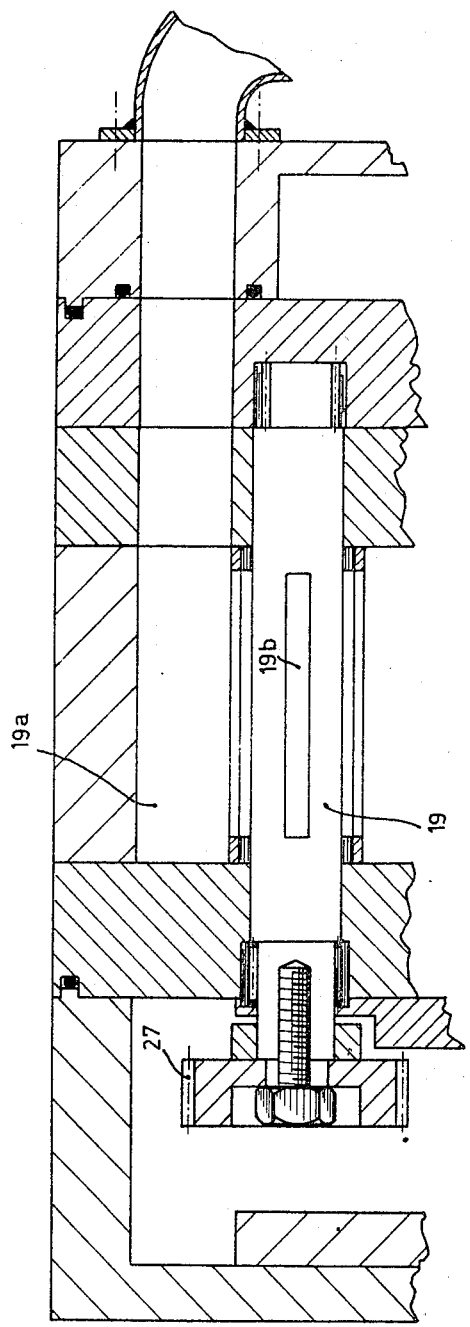
Figure 10:
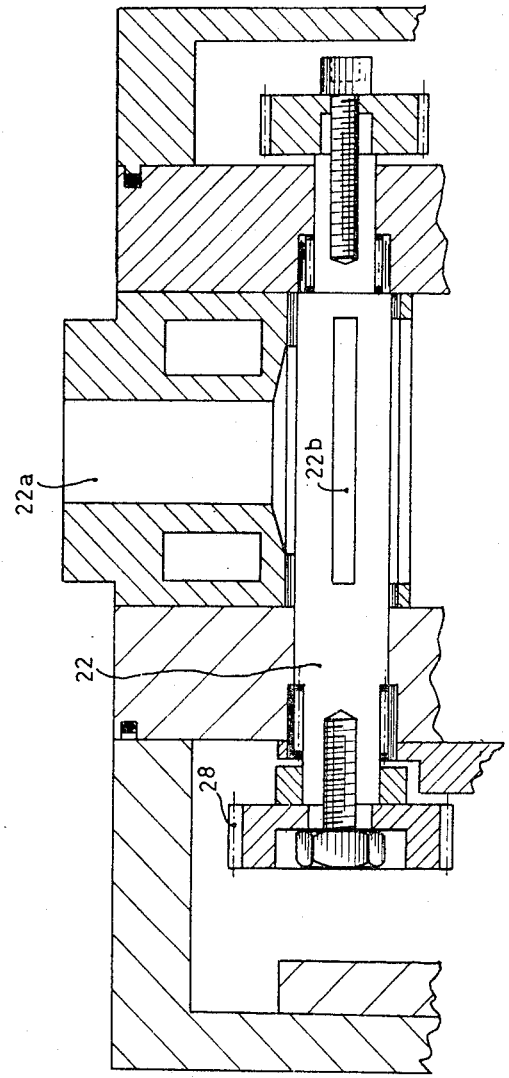
Figure 11:
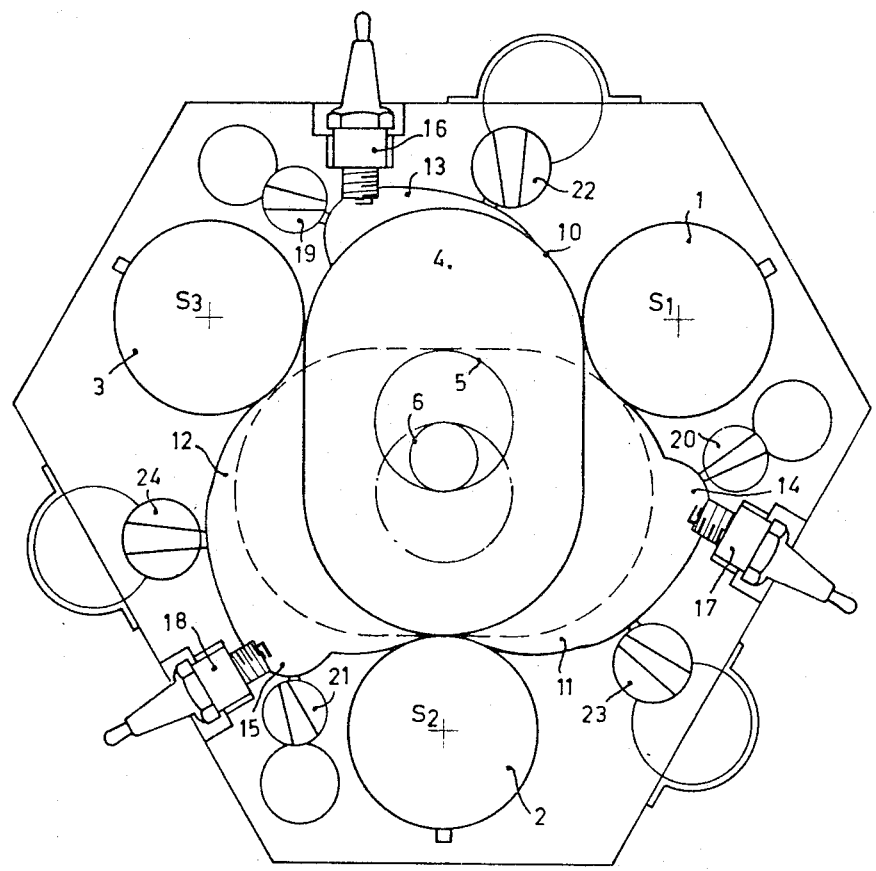

FIGS. 9 and 10 are cross-sectional views along line IX—IX and X—X of FIG. 8;

FIGURE 11 illustrates a modification of the engine according to FIGS. 8 and 9 with different dimensions.

Figure 1:
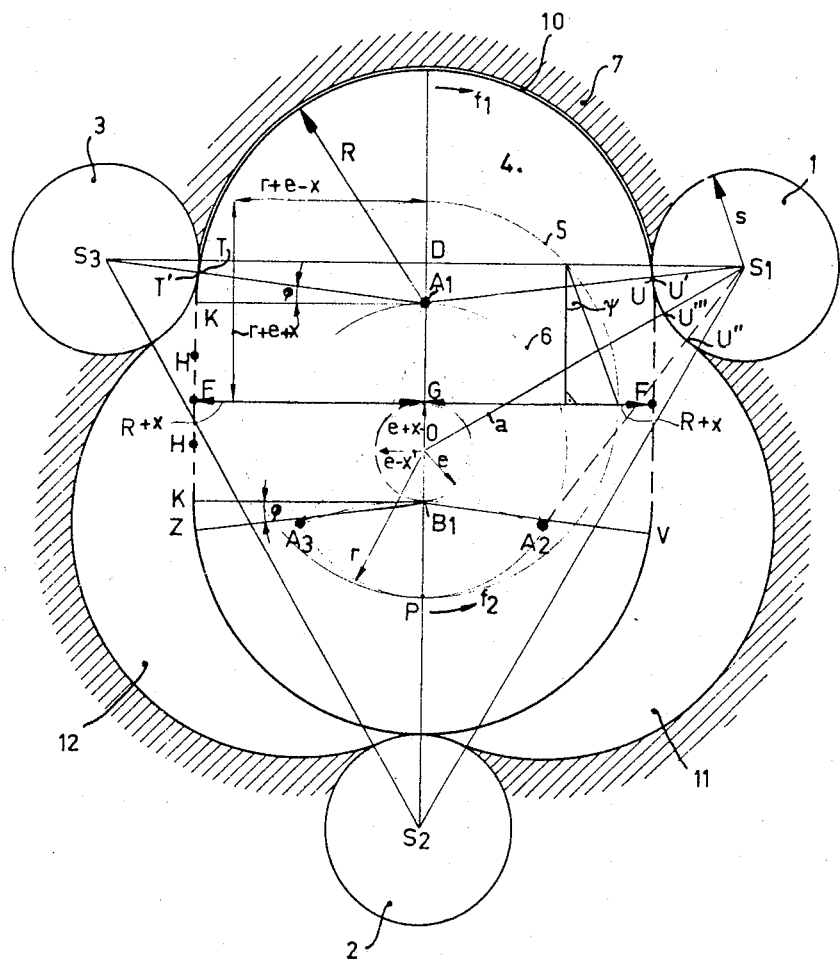
FIG. 1 shows the piston in a position for which its longitudinal axis coincides with a bisecting line of the above-mentioned triangle.

Referring to the drawing, in FIG. 1, an elongated piston 4, the centre of symmetry of which lies at G, is shown as fitted between the three cylinders 1, 2, 3. The centre of symmetry of the entire machine is given as O, or the centre of the equilateral triangle, of which the three apices S1, S2 and S3 form the centres of the three cylinders 1, 2, 3, the radii of which are all equal to $s$. Th piston 4 has a central opening with its centre at G, the peripheral wall of which opening runs over a central wheel 6. The stationary rotary axis and centre of this wheel coincide with the centre of symmetry O of the machine. The wheel 6 is thus concentrically carried by a central shaft and its radius is $r$. It may be formed by a toothed wheel having a pitch diameter equal to $r$ and which meshes with a corresponding inner series of teeth on the peripheral wall of the opening 5. When the forces to be transmitted from the piston onto the wheel or vice versa are not too large, the wheel 6 may be given also a smooth cylindrical surface, which rolls frictionally over the similarly smooth peripheral wall of opening 5. The radius of the quadrant of opening 5 is defined, from a zero angle of the horizontal line passing through point F in FIGURE 1, by the formula $$\frac{\sqrt{(e \pm x \sin 45°)^2 + [(r \pm x) - (e \pm x \sin 45°)^2]}}{\sin 4}$$

In the above formula the $+x$ value refers to one direction of the quadrant and the $-x$ to the opposite direction. At least one of the two contacting surfaces can advantageously be formed by a somewhat elastically yielding material.

The cylindrical chamber inside which the piston 4 rotates is designated by 7 and is constituted by three arcuate outline sections interconnected permanently by the peripheral sections of the above-mentioned cylinders 1, 2, 3, so as to define three elementary chambers 10, 11 and 12.

The piston 4 is constituted by an elongated body limited by two diametrically opposed arcs of a circle TU and VZ having their centres at A1 and B1 and the radius of which is R, while two approximately rectilinear curved sections UV and ZT connect said arcuate outlines so as to form the lateral sides of the piston extending symmetrically with reference to the longitudinal axis of the piston passing through A1 and B1.

The length of said arcuate lines, TU and VZ, and, also, the arcuate shape of the above-mentioned connecting sections UV and ZT may be defined accurately and unequivocally, as will be disclosed hereinafter and, require that the periphery of the piston be subjected, during the rotation of the piston, to a permanent and uniform treble contact with the three cylinders 1, 2, 3 so as to ensure thereby reliable fluidtightness for the elementary chambers 10, 11, 12.

Figure 3:
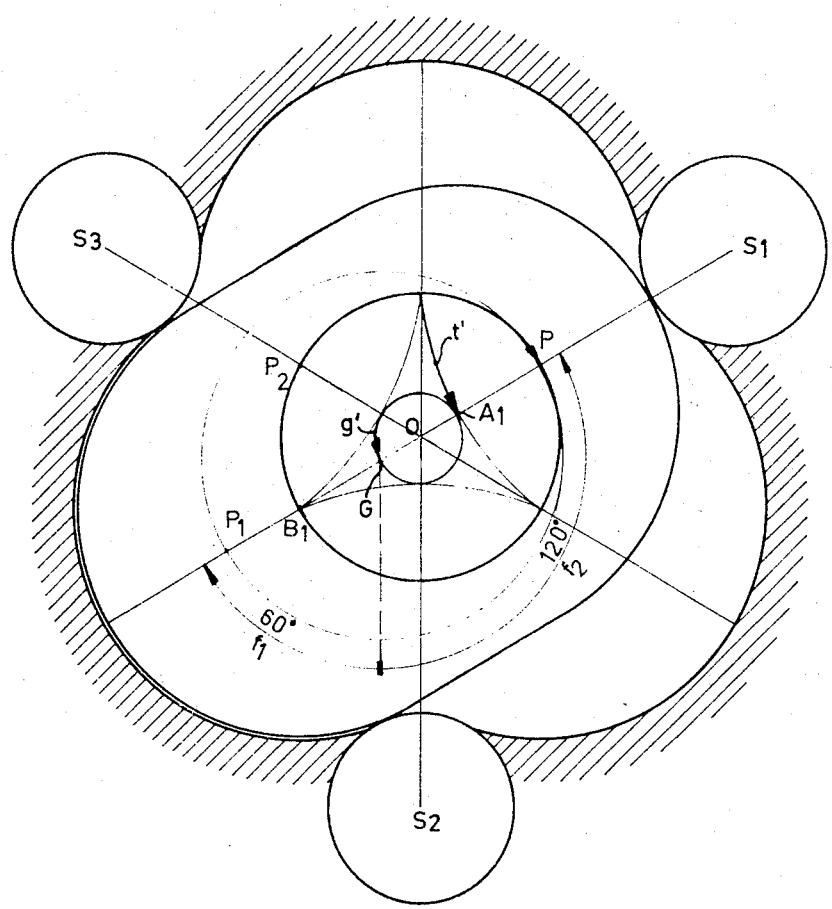
FIG. 3 shows the piston after a clockwise rotation through 60° out of its position according to FIG. 1.

The starting point for the designing of the piston and the arrangement of the three cylinders is based on the following considerations:

In order that the piston 4 may, starting from the position illustrated in FIG. 1 and while both its arcuate outline sections are in constant uniform contacting relationship with the cylinders S1, S2, reach the position illustrated in FIG. 3, the centre of the piston G must move round the centre of symmetry O of the machine along a path of which the spacing with reference to the centre of symmetry O varies periodically by a small amount $\pm x$ with reference to the average spacing GO$=e$. In order to produce such a movement and to take into account such modifications in spacing for the piston centre G with reference to an accurate circular path round the centre of symmetry O, it is necessary to design the shape of the inner peripehral surface of the opening 5 in the piston correspondingly with a difference with reference to a true cylindrical surface.

In fact, it is always necessary, when the longitudinal axis of the piston passing through the points A1, B1 registers with a bisecting line of the triangle S1, S2, S3, the spacing OG must reach its minimum $e-x$. Consequently, since the central wheel 6 is arranged concentrically with reference to the centre of symmetry O, the diameter of the central opening 6 of the piston must be equal, in the longitudinal direction of the piston, to $2(r+e+x)$, in the transverse direction of the piston, to $2(r+e-x)$ and along diagonal lines at 45° to $2(r+e)$. The accurate shape of the intermediate area of the inner peripheral surface of the piston opening may be defined by points in a simple manner, in accordance with geometrical or trigonometrical considerations which need not be discussed further. Through this designing by successive points of the inner peripheral sections of the opening in the piston, as may be executed in practice by means of four stencils, it is possible to obtain with an entirely uniform three-point contacting between the peripheral area of the piston and the three cylinders, a constant uniformity, for all positions of the piston, of the radial force arising during the rolling of the wheel along the inner peripheral surface of the opening in the piston or during the engagement of the toothed wheel 6 with the inner series of teeth in the piston.

In order to define the length of the piston 4, it is also essential for the spacing between the points A1 and B1, that is between the centres of the two arcuate outline sections of the piston, to be equal to A1B1$=4e+2x$.

For the execution of the rotary piston machine, it is necessary to consider six parameters OS1$=$OS2$=$OS3$=a$, $R$, $r$, $e$, $s$, and $x$ and of these it is possible to select freely the three magnitudes $R$, $r$ and $e$ for instance whereas the three other magnitudes $a$, $s$ and $x$ are then calculated as functions of $e$, through the agency of three defining equations. The first of these defining equations can be read directly out of FIG. 1 and may be expressed as follows:

$$R+S=a-e$$

A second equation between the magnitudes $a$, $e$ and $x$ is obtained through application of the Pythagorean proposition to the triangle D S1 A1 illustrated in FIG. 1, where D is the crossing point between the longitudinal axis of the piston and the line connecting the points S1 and S3. It is not necessary to explain with further detail that three sides of said triangle, to wit: DS1, S1A1 and A1D may be expressed without any further difficulty starting from the three parameters $a$, $e$ and $x$. It suffices to mention that $S1A1=R+s=a-e$.

Figure 2:
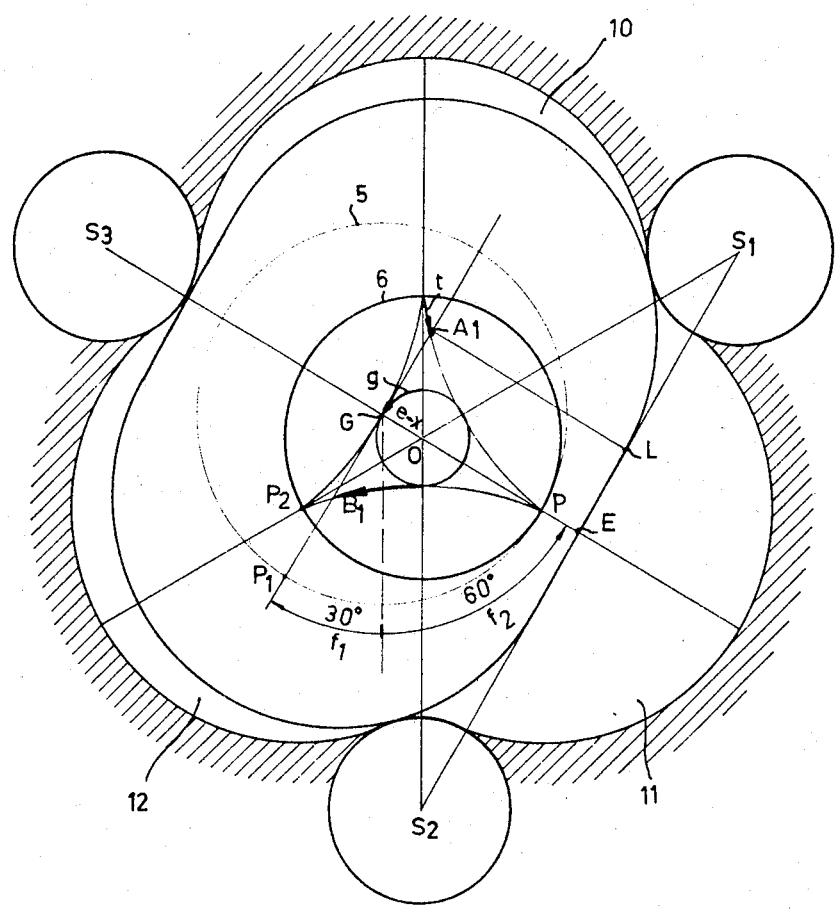
FIG. 2 shows the piston after a clockwise rotation through 30° out of the position illustrated in FIG. 1.

To obtain the third defining equation required, it is necessary to consider the position of the piston illustrated in FIG. 2 in which the piston has rotated clockwise by 30° with reference to its position illustrated in FIG. 1, and the longitudinal axis of the piston extends in parallelism with the connecting line S1S2. In this case, the Pythagorean proposition should be applied to the triangle S1 L A1, where L is the foot of the perpendicular passing through the point A1 and at right angles with the connecting line S1S2. The location of the point A1, that is, of the centre of the upper arcuate outline section of the piston has moved, upon rotation of the piston, into the location illustrated in FIG. 2 along the arcuate line designated by $t$, which arcuate line extends along the circle of a constant radius $R+s$ having its centre at the point S1, since the piston 4, as it rotates, is in permanent contact with the cylinder through its upper arcuate outline section.

Furthermore, the three sides of said triangle, to wit: S1L, LA1 and A1S1 may be expressed by the parameters $a$, $e$ and $x$.

With respect to the above mentioned sides of the triangle, it should be remarked merely that $A1S1=a-e$ and $LS1=ES1-EL$, wherein $E1=GA1=2e+x$ while $A1G=S3E-S3G=a/2+e-x$.

The three above-mentioned equations allow expressing $a$ as well as $x$ as functions of $e$.

$$a=7.94e \text{ and } x=0.016e$$

where the values are approximate values, sufficient for practical purposes.

As far as the distances between the points of reversal of movement of the centres A1, B1 of the arcuate outline sections of the piston are concerned, the following equation is true, as appears from a consideration of the triangle OA2A3 (FIG. 1), to wit:

$$A1A3=A3A2=A2A1=(3e+2x)\sqrt{3}$$

Simultaneously, the accurate size of the arcuate outline sections of the piston TU and VZ may be defined, along which sections the periphery of the piston registers with a true arc of a circle. The ends of these arcuate outline sections T and U, as well as V and Z are obtained by a graphic construction of the crossing points between the connecting lines A1S1 and A1S3 and the periphery of the piston, when the piston occupies the position illustrated in FIG. 1. Trigonometrically, the terminal points of said arcuate outline sections of the piston are given by the angle $\psi$ illustrated in FIG. 1, for which $$\cos \psi = \sqrt{3}a/2(R+s)$$

This expression is obtained directly through examination of the triangle S3DA1. The sections TZ or UV of the piston periphery which have not been defined yet may be obtained by drawing, point by point, or a calculation by successive points may be made for which the piston 4 is assumed to rotate clockwise by successive angles as small as may be desired, out of the position illustrated in FIG. 1, while the movement of piston is defined in an unequivocal manner by its permanent contact with the cylinders 1 and 2. It is immediately apparent that, except for the position of the piston illustrated in FIG. 1 and the corresponding similar positions obtained each time after rotation through 60°, for which two of the cylinders are in contact with one of the arcuate outline sections of the piston and the third cylinder is in contact with the apex of the other arcuate outline section of the piston, there is always, for any other position of the piston, one of the cylinders in contact with one point of one arcuate outline section and a second cylinder which is always in contact with one point of the other arcuate outline section. When the piston rotates through 60° clockwise, starting from the position illustrated in FIG. 1 towards the position illustrated in FIG. 3, the contact point U' is shifted over the cylinder 1 with the arcuate outline section TU along the arc U'U'' on the cylinder and along the arcuate outline section from U up to the apex of said arc. Simultaneously, the point of contact of the other arcuate outline section with the cylinder 2 moves from the apex towards the end point of said arc V. Since there are thus always two pairs of outlines in contact, the position of the piston is always defined accurately and it is sufficient, for any number of intermediate positions, to draw at any moment a perpendicular passing through the centre of the third cylinder, in the example illustrated through S3, and at right angles with the longitudinal axis of the piston. At this moment, the size of the half transverse axis of the piston which defines in fact the outline of the peripheral sections TZ or UV, is given by the difference between said perpendicular and the radius $a$ of the cylinder. Obviously, it is sufficient to form point by point the peripheral section TZ according to FIG. 1, since, for reasons of symmetry, the section FZ and the section UV are then known.

Starting from such a structure, it is first apparent that the peripheral sections TZ and UV differ from a straight line by very small amounts. For instance, the half transverse axis of the piston passing through the point A1 (FIG. 1) is given by the value $A1K=R+x$, whereas the half transverse axis passing through the entire of the piston G is exactly equal to the value $GF=R+x$.

The difference with reference to a straight line is thus equal at a maximum to twice $x=0.016e$.

In order to discuss the movements of the piston and of the wheel, three particular points will be described hereinafter reference being made to FIGS. 1, 2 and 3, and it is assumed that the piston rotates clockwise as shown by the arrow $f1$.

*Movement of the centres A1 and B1 of the arcuate outline sections of the piston*

When the points of contact between the piston 4 and the cylinder 1 move along the arc on the cylinder from U' towards U'', the centre A1 of the arcuate outline section TU describes an arc of a circle from A1 towards A2 round the point S1 with a radius $R+s$ which is constant;

The three arcuate lines A1A2, A2, A3 and A3, A1 form thus a closed path for the points A or B during one revolution of the piston, the point A1 moves thus according to FIG. 2 or 3, along the arc $t$ or $t'$.

*Movement of the centre G of the piston*

The piston centre G describes a rotary movement, in a direction opposed to the direction of rotation of the piston, round the centre of symmetry O of the machine. In fact, after a rotation of the piston through 30° or through 90°, the point G has travelled along the curve $g$ or $g'$ in the opposite direction as shown in FIG. 2 or 3, while the angle through which it has moved is twice larger than the angle of rotation of the piston, that is through 60°. It should also be remarked that the point G moves round the point O at a variable distance with reference thereto. It is true that the path of G oscillates reciprocally between a maximum spacing $(e+x)$ for the positions of the piston illustrated in FIGS. 1 and 3 and a minimum spacing $(e-x)$ for the position of the piston illustrated in FIG. 2. Meanwhile, the period of said pendular movement is equal to 120°, which corresponds thus to a period of 60° for the movement of the piston.

*Movement of the point of contact between the wheel 6 and the inner wall of the opening 5 in the piston*

As illustrated in FIGS. 1, 2 and 3, the point of contact P between the wheel 6 and the inner wall of the opening in the piston 5 or, in the case of toothed wheels, the point of engagement moves for a rotation of the longitudinal axis of the piston through 30° or through 60° round the centre G of the piston, along the inner wall of the opening in the piston, along an arc PP' measuring altogether 90° or 180° with reference to the centre of the piston G. The peripheral movement of the point of contact between the wheel 6 and the inner wall of the opening 5 in the piston is the resultant of two partial movements: first, the rotation of the piston in a clockwise direction (arrow $f1$) round its centre G through 30° in the case of FIG. 2 and through 60° in the case of FIG. 3 and on the other hand, the peripheral movement of the centre G of the piston round the centre O of the machine in an anti-clockwise direction (arrow $f2$) with a speed twice higher through 60° in the case of FIG. 2 and through 120° in the case of FIG. 3.

The angular speed of the point of contact P of the wheel 6 is thus, with reference to the inner wall of the piston 5 in the piston, three times as large as the angular speed of the piston with reference to the casing. With reference to the casing, however, the contact point P moves in a direction opposed to the direction of rotation of the piston with an angular speed which is only double, since it is necessary, in this case, to subtract the rotation of the piston obtained simultaneously and performed in the opposite direction.

It should be remarked that the above considerations are true in all cases, independently of the ratio between the diameters of the wheel and of the central opening in the piston. This relationship between the diameters defines only the ratios between the angular speeds of the piston and of the central wheel; that is, the actual speed-reducing ratio between the rotary movement of the piston and the rotary movement of the driving or driven shaft. In the example illustrated, the relationship between the diameters of the wheel and of the central opening of the piston is selected as equal to 3:4; in other words, the diameter of the wheel is equal to $2r=6e$, while the piston opening 5 has an average diameter equal to $8e$. Consequently, to a rolling movement through an angle of 90° or 180° over the wall of the opening 5 in the piston, there corresponds an angular rolling movement of the wheel 6 itself which is larger by 4:3. Thus, the arc PP2 on the wheel 6 is equal to 120° in FIG. 2 and to 240° in FIG. 3. From these angular rolling movements, it is necessary to subtract, when it is desired to consider the actual rolling rotary speed of the wheel 6 with reference to the casing, the angle of 60° or 120° (arrow $f2$) through which the centre G of the piston moves in the opposite direction. This means, in the case of the example considered, that with a ratio of 3:2 between the diameters of the wheel 6 and of the opening 5 in the piston, the speed-reducing ratio between the angular speeds of the piston and of the wheel 6 is exactly 1:2.

In general the following considerations are true when the piston executes, with reference to the casing a rotation through an angle $y$, the wheel 6 rotates in the same direction with reference to the casing through an angle corresponding to the difference $3xud-2x$, $ud$ being the relationship between the diameters of the opening in the piston and of the wheel. This difference is a consequence of the above considerations and corresponds to three times the movement of the contact point between the wheel and the inner wall of the opening in the piston which value is multiplied by the relationship between the diameters, while there is deducted twice the angle defined by the movement of the centre of the piston.

In general, the following equation is true for the ratio between the angular speeds ($\alpha K$ and $\alpha R$) of the wheel:

$$(\alpha K/\alpha R)=1(3ud-2)$$

For instance, for a diameter relationship $$ud=2:1-3:2-4:1$$

or 5:4, there are obtained speed-reducing ratios between the angular speeds equal to 1:2—2:5—1:2 or 3:5.25.

The rotary piston machine according to the invention allows thus a suitable matching both of the wheel diameter and of the speed-reducing ratio with the applications to be considered for the machine. Since it is possible to draw point by point the shape of the inner wall of the piston opening, it is possible, as already mentioned, to obtain for all desired positions of the piston, a perfectly uniform engagement of the wheel 6 with the corresponding inner series of teeth of the opening 5 in the piston. This requirement cannot be obtained accurately in the case of the known rotary piston machines, which operate with a wheel carried eccentrically on the central shaft and with an accurately circular opening in the piston since, there, for a constant uniform contact of three points of the periphery of the piston with the three cylinders, the distance between the centre of the central wheel and the centre G of the piston G is modified slightly during the movement.

The bearing of the piston in all its positions is obtained exclusively through its three points of contact with the three cylinders and by no means through the contact between the central wheel and the inner wall of the opening in the piston, so that the driven or driving shaft carrying the wheel 6, is not subjected to any radial thrust and has only to absorb the actual rotary torque corresponding to the driving or driven rotation. Thus, the bearings of said shaft are also relieved.

When operating with large compressional pressures in the elementary chambers 10, 11 and 12, it is preferable to select cylinders 1, 2 and 3 with comparatively large diameters and to provide a correspondingly small piston, as shown by the equation $(R+s)=(a-e)$, whereas, for smaller compressional pressures, a larger piston may be selected, with correspondingly smaller cylinders 1, 2 and 3.

Apart from the simple geometrical shape of the piston and of the simple solution provided for the fluidtightness problem, the rotary piston machine according to the invention shows still further technical advantages.

Since the same operative stroke is obtained in succession in each of the three symmetrically arranged elementary chambers 10, 11 and 12, there is ensured a very uniform heating of the cylinder block and there is furthermore enough room for a large cooling of the walls of the chambers.

Furthermore, the relationship between energy and travel during the compression is particularly favorable during the compression in one of the elementary chambers.

It is immediately apparent that the rotary piston machine according to the invention can be used as a compressor, a pump, a vacuum pump or an engine and in the last-mentioned case, the explosion chambers are either separate from the elementary chambers 10, 11, 12 or else these elementary chambers themselves may serve in alternation as explosion chambers. If explosion chambers are used, which are independent of the elementary chambers and are arranged outside the latter, in this case there are executed, during a complete revolution of the piston, six complete operative cycles, whereby in each of the three elementary chambers there is obtained twice a suction stroke and twice a compression stroke. In the other case, there are produced during a rotation of the piston, three complete operative cycles.

In the case of pumps and compressors, it is advantageous to operate without any teeth between the wheel and the piston and to use a mere frictional motion, which simplifies considerably the execution of the machine.

Figure 4:
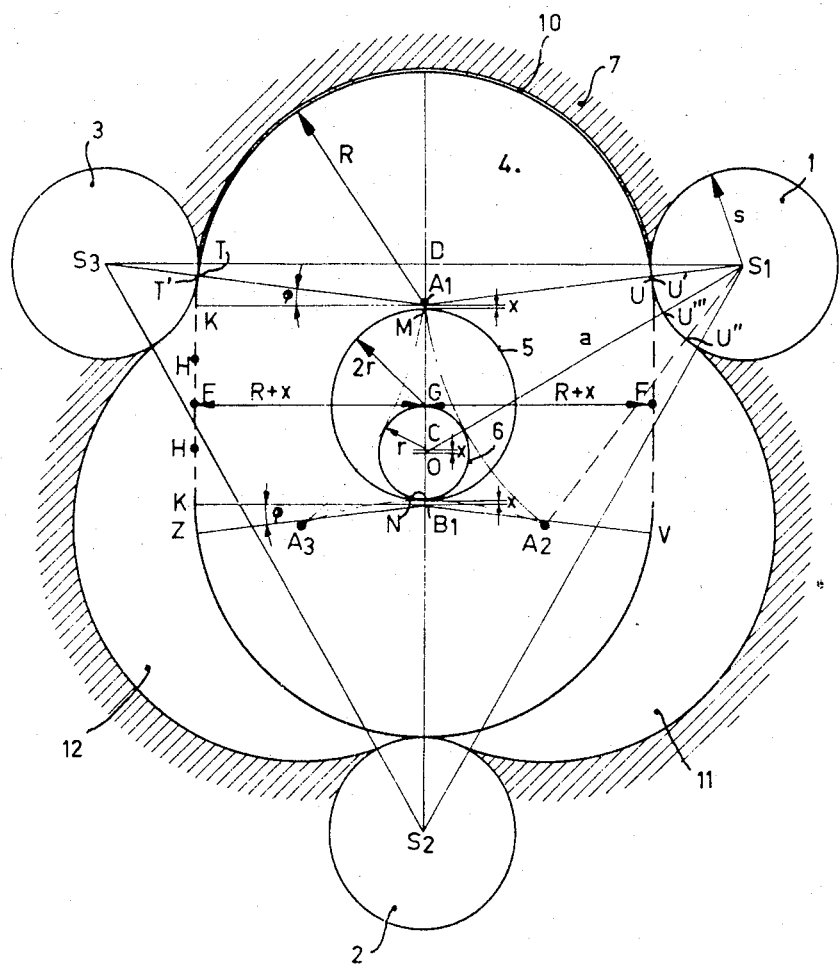
FIG. 4 to 6 illustrate a second embodiment corresponding to FIGS. 1 to 3 for the particular case where $r=e$; while the central wheel is carried eccentrically with its centre C lying eccentrically on the central shaft having its axis at O, and the opening in the piston has a constant radius $2r$.
Figure 5:
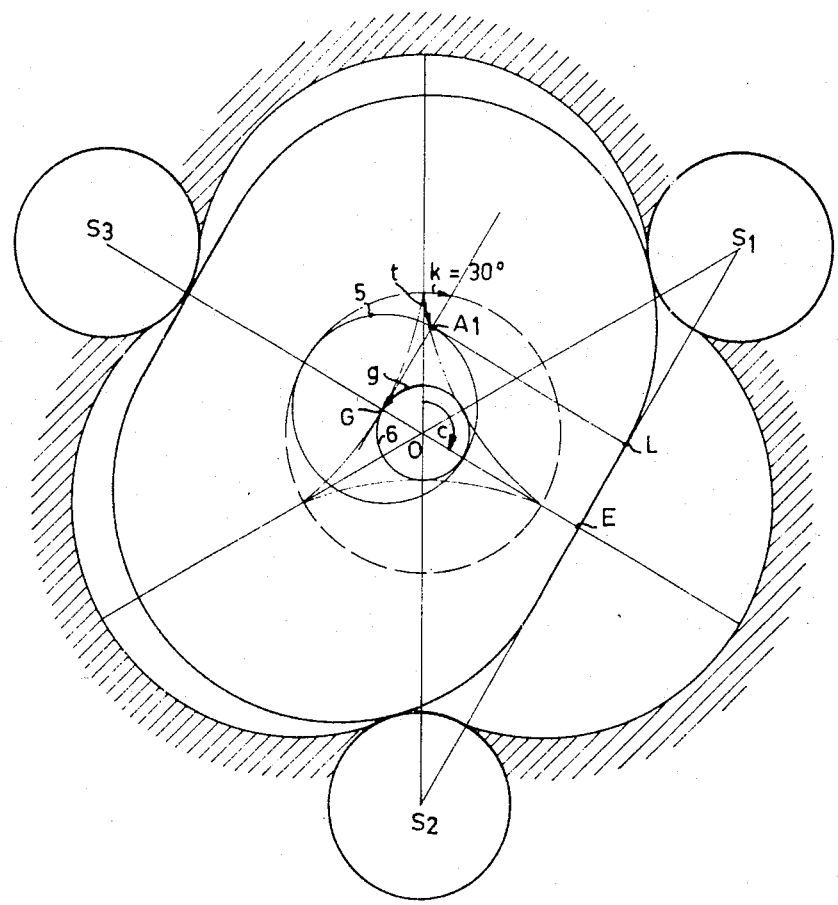
Figure 6:
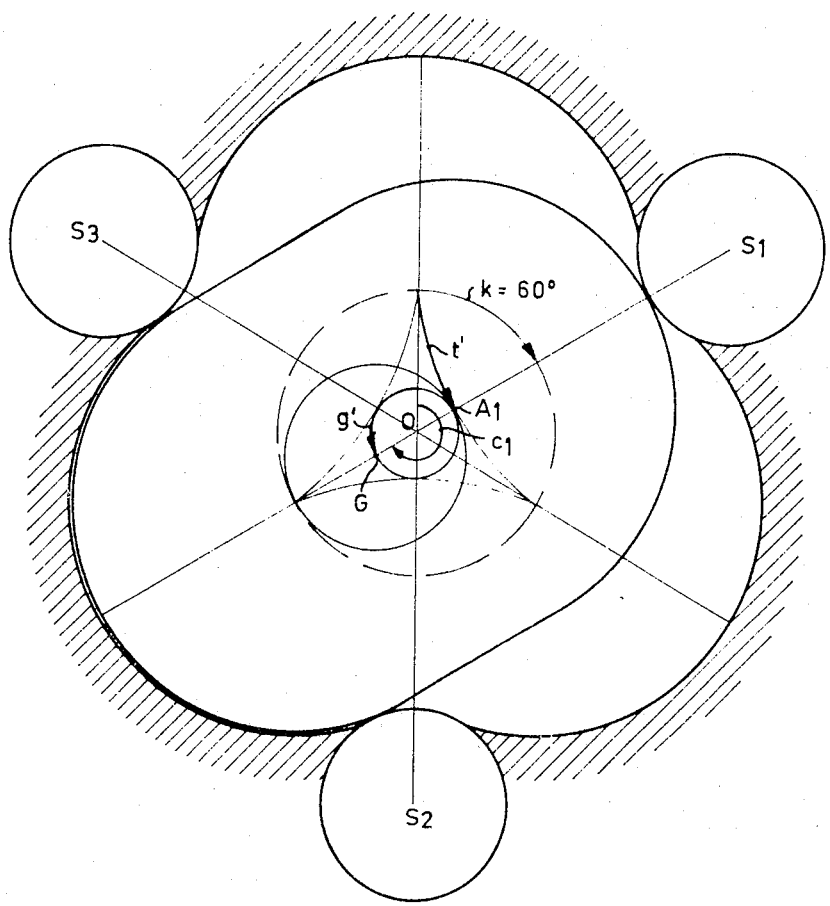

In the example illustrated in FIGS. 4 to 6 in which all the reference numbers of FIGS. 1 to 3 are used and have the same meaning, the particular case $r=e$ is shown, while the diameter of the opening 5 in the piston is given a value $4r$. In this particular case, the above-described movement of the centre G of the piston round the centre of symmetry O of the machine may also be obtained, if desired, by operation with an accurately circular opening in the piston, while, however, the wheel 6 is carried eccentrically by the shaft. The centre C of the wheel 6 and the centre of symmetry O defining the rotary axis of the wheel 6 are then spaced by a distance $x$.

The piston movement is governed in the same manner as that described for the examples of FIGS. 1 to 3, provided $e$ is always replaced by the radius $r$. In particular, the movements of the points A1 and B1 and also of G are produced exactly in the same manner. As to the point through which the wheel 6 rolls along the periphery of the opening in the piston, the angles travelled over by it vary as follows by reason of the different diameter relationships.

Starting from the position illustrated in FIG. 4, for which the distance between the centre O and the point of engagement of the toothed wheel 6 with the inner series of teeth 5, is equal to $(r-x)$, the centre C of the wheel (lying for the position illustrated in FIG. 4, on the side opposed to the point of engagement), moves through an angle of 120° or 240° round the centre O, as designed in FIGS. 5 and 6 by $c$ and $c1$, respectively, this movement being executed in the same direction as the rotation of the piston. The speed-reducing ratio between the angular speeds of the piston and of the toothed wheel is thus equal to 1:4, while the average ratio between the angular speeds of the piston and of the radial sector OG is equal to 1:2.

For the position illustrated in FIG. 5, the centre C of the toothed wheel 6 lies thus again on the line connecting the centre O with the point of engagement between the toothed wheel and the inner series of teeth; but, this time, on the side of O which faces the point of engagement. For this position, the distance between the centre C of the toothed wheel and the centre of the piston G is again equal to the pitch radius $r$. For the position illustrated in FIG. 6, the relative position of O, C, G is again the same as in FIG. 4; in other words, C lies on the side of the point of contact between the toothed wheel and the inner series of teeth, which faces away from O, while the distance CG is equal again to $r$.

For the intermediate positions, the distance CG differs slightly from the accurate value $r$. This result, which leads to a very small irregularity in the engagement of the toothed wheel and may be neglected in practice in most cases, may however be completely cut out if, according to the embodiment illustrated in FIGS. 1 to 3, the operation is executed with a toothed wheel carried concentrically by the shaft and with a modified shape given to the opening in the piston.

FIGS. 7 and 8 show the application of the machine according to FIGS. 1 to 3 to an internal combustion engine. The three cylinders providing fluidtightness for the piston 4 are designated again by 1, 2 and 3, the cylinder chamber by 7, the central wheel by 6 and the opening in the piston by 5. The three elementary chambers 10, 11 and 12 each have a recess 13 14 and 15 forming an ignition chamber and are arranged asymmetrically with reference to the apex of the arc enclosing the corresponding elementary chamber.

While the piston 4, starting from the position illustrated in FIG. 7, executes a complete revolution in a clockwise direction, the toothed wheel 6 running over the inner series of teeth 5, executes, by reason of a diameter relationship equal to 4:3, two complete revolutions round its rotary axis O, also in a clockwise direction, while the centre of symmetry G of the piston revolves twice in an anti-clockwise direction round the axis O. This means that each of the three elementary chambers 10, 11 and 12, in succession, is completely filled after a corresponding rotation of the piston through 60° by an arcurate outline section of the piston, while said compression cycle is executed in a direction opposed to the rotation of the piston, that is consequently that after one rotation of the piston, out of the position illustrated in FIG. 7 through 60° in a clockwise direction the compression reaches its maximum in the elementary chamber 12.

Each of the above-mentioned ignition chambers 13, 14 and 15 is provided with an ignition plus 16, 17 or 18 and is associated with a corresponding fuel admission valve 19, 20 or 21. On the outside of the ignition chamber, each elementary chamber is connected with an exhaust valve 22, 23 or 24, lying to the rear of the ignition chamber with reference to the direction of rotation of the piston. In the embodiment illustrated, there are shown rotary valves provided with passage-forming slots 19b and 20b (FIGS. 7, 9 and 10) of which valves at any time the admission and exhaust valves associated with a same and single chamber are caused to rotate as provided by a common toothed wheel 25 which is driven in its turn by the toothed wheel 8 carried by the driven shaft through the agency of the toothed wheel 26 carried coaxially by the toothed wheel 25. In FIG. 7, only the toothed wheels 25, 26, 27, 28 controlling the valves 19 and 22 are illustrated. Toothed wheels 27 and 28 are carried directly by the valve bodies, as illustrated in FIGS. 9 and 10.

The admission valves 19 to 21 allow a periodic connection for a predetermined direction through the passageway formed in said valves between each ignition chamber and the fuel-feeding pipe 19a, 20a, or 21a, whereas, on the other hand, the exhaust valves 22–24 of the elementary chambers are connected intermittently with the exhaust pipes 22a, 23a, 24a, the transmission ratio of the gearing 25, 28 being selected correspondingly.

The rotary piston engine described operates as follows:

In the position of the piston illustrated in FIG. 7, the compression of the fuel mixture in the elementary chamber 10 is at an end and the ignition plug provides an explosion of the mixture. By reason of the asymmetric shape of the ignition chamber 13 with reference to the apex of the arc defining the elementary chamber and, consequently, with reference to the longitudinal axis of the piston in its position corresponding to ignition, the expanding ignited fuel mixture exerts a tangential force on the periphery of the piston in a clockwise direction, (as shown in FIG. 7). This force causes the piston to execute its operative stroke which corresponds to the clockwise rotation through about 90°. While this operative stage is being performed in the elementary chamber 10, there is obtained first, during the first rotation of the piston through about 30°, the end of the suction of the fuel mixture produced through the open admission valve 50 into the elementary chamber 11 which is closed when the piston has reached substantially the position illustrated in FIG. 8. After closing of the admission valve there is obtained compression inside the elementary chamber 11 during the further rotation of the piston.

At the same time and during the first stage of the rotation of the piston through 60° (starting from the position of the piston illustrated in FIG. 7), the burnt fuel mixture is exhausted out of the elementary chamber 12 through the exhaust valve 24 which is still open for this purpose. After the end of this first rotation through 60°, a further suction into the elementary chamber 12 begins then through the admission valve 21 which now opens.

After a rotation through 90°, the operative stage in the elementary chamber 10 is at an end and during a second rotation of the piston through 90°, the exhaust of the burnt gas mixture is performed in said elementary chamber through the exhaust valve 22 which now opens. After the end of the first half revolution of the piston, the latter has returned into the position illustrated in FIG. 7 and the exhaust stage begins in the elementary chamber 10 and this is followed during the last quarter of the revolution of the piston by the compression stage, while inside the two other elementary chambers the corresponding stages or portions of stages are being executed.

For the intermediate position of the piston illustrated in FIG. 8 and for which, starting from the position illustrated in FIG. 7, a 30° rotation in a clockwise direction has been executed, the volume of the elementary chamber 11 is at a maximum corresponding to a transition between the suction stage and the compression stage or to a transition between an exhaust stage and a suction stage in the case of a position of the piston shifted by 180°.

During a complete revolution of the piston, four stages of operation (suction, compression, ignition, expansion and exhaust) follow one another in the different elementary chambers while, by reason of the symmetrical arrangement of the three elementary chambers, the operative cycle is shifted by 120° from one elementary chamber to the next. The admission and exhaust valves of each elementary chamber are controlled by the driven shaft through the above-mentioned speed reducing gear (8, 25, 26 and 27, 28) in a manner such that for every two revolutions of said shaft which corresponds to a complete revolution of the piston, each of the corresponding admission or exhaust valves is open transiently during the suction or exhaust stages of the corresponding elementary chamber. If these valves are provided with a diametric passageway or channel (19b or 20b) which ensures thus after each half revolution of a valve the connection of the elementary chamber with the feed pipe or with the exhaust channel, these valves must during a complete operative cycle of the engine execute only one half revolution whereby they are subjected to a speed reduction by 4 with reference to the driven shaft carrying the toothed wheel 8.

The compression rate obtained with the rotary piston engine according to the invention is equal to about 1:10. Apart from the geometrically simple structure of the piston, the compact execution of the engine and the simple solution given to the problem of fluid-tightness, the rotary piston machine disclosed affords still further technical advantages.

Since a single same operative stroke is performed in succession in each of the three symmetrically arranged elementary chambers 10, 11 and 12, there is obtained very uniform heating of the cylinder block and there is, furthermore, enough room in the stator 9 for a sufficient cooling of the walls of the chamber. Additionally the driven shaft is relieved of all undesired radial forces, since the piston 4 rests permanently in a well-defined manner through three symmetrically located points of its periphery.

If the same driven shaft is caused to carry two adjacent units formed by the above-described rotary piston machine, in a manner such that the longitudinal axes of the two pistons meshing each with a toothed wheel 6 are perpendicular to one another, there is obtained an excellent dynamic balance of the two pistons. The operative cycles of the two engine units overlap in a manner such that, during each third of a revolution of both pistons, there are obtained two ignitions spaced by a 30° rotation of the pistons. Next rotation of the piston through 90° is executed until the next ignition is produced. In order to provide, on the one hand, a good dynamic balance of the engine and, on the other hand, a perfectly uniform succession of ignitions, it is of advantage to fit four units formed of the above-described engines on a common driven shaft with the longitudinal axis of each piston shifted with reference to the longitudinal axes of the three other pistons by 45°, 90° and 135°. In this case, the different cycles, the number of which is equal to four times three in the elementary chambers of all the engine units, are phase-shifted in a manner such that, after each rotation of the four pistons through 30°, an ignition is obtained and a further operative cycle begins.

Thus, whereas a single engine unit according to FIGS. 7 and 8 is equivalent to a conventional three cylinder engine, the above described two or four engine units carried by the same output shaft, correspond to a six or twelve cylinder engine.

The volume of each elementary chamber 10, 11 or 12 corresponds substantially to 40% of the cylinder volume enclosed by the arcs defining the elementary chambers.

In the embodiment illustrated in FIG. 11, the structure of which is, in its principle the same as for the rotary piston engine according to FIGS. 7 and 8, the diameter of the cylinders 1, 2, 3 with reference to the piston dimensions is larger than in the example illustrated in FIGS. 7 and 8. This embodiment, with comparatively large contact cylinders when compared with the dimensions of the piston, is of advantage when it is desired to operate with high compressional pressures and therefore particularly reliable fluidtightness means are obtained.

Furthermore, in the embodiment according to FIG. 11, the shape of the ignition chambers 13, 14, 15 differs slightly from that in the embodiment illustrated in FIGS. 7 and 8. However, the shape of each recess forming an ignition chamber is again asymmetric with reference to the apex of the arc defining the elementary chamber and it chiefly includes a section extending at least approximately in a tangential direction with reference to the arc defining the elementary chamber and a further section which is substantially radial with reference to said arc. Furthermore, the exhaust valves 22, 23, 24 open in the area of the ignition chambers, in contradistinction with the first embodiment.

As an alternative to the use of rotary valves controlled through a gearing by the output shaft of the engine, the engine according to FIG. 11 operates with cam-controlled admission and exhaust valves in a manner such that the valves 19 to 24, positioned again so as to revolve around axes parallel with the engine shaft, execute only a slight rocking movement so that, to obtain a connection between the elementary chamber considered and the admission or exhaust pipe, the diametrical passageways forming channels in the valves register with the corresponding openings of the elementary chamber. In the position according to FIG. 11, the admission valves 19 and 21 and also the exhaust valves 22, 23 are closed, whereas the admission valve 22 for the elementary chamber 11, in which, as described, the suction is obtained for the position of the piston which is illustrated and also the exhaust valve 24, corresponding to the elementary chamber in which the exhaust is being produced, are open. A cam disc, which is not illustrated and which is controlled by the engine shaft, ensures the opening and closing of the valves at the proper moment. With reference to the use of rotary valves, the valves which have just been described execute only a small angular movement at a time in the embodiment according to FIG. 11, with the advantage of lesser wear.

When one operates only with a single rotary piston unit, it is possible to provide, if desired, a flywheel on the output shaft of the engine. The contact cylinders 1, 2 and 3, between which the piston 4 rotates and which ensure simultaneously fluidtightness between the three elementary chambers, may be formed either by rotary cylinders or else by stationary cylinders such as corresponding cylindrical projections of the stator walls.

It will be understood by those skilled in the art that many modifications and improvements may be brought to the claimed device without departing from the spirit and scope of the invention.

What is claimed is:

1. A rotary piston engine comprising an engine chamber having therein:
   (A) an elongated piston having a given radius and a shape defined by two arcuate sections of a circle facing each other, said piston having a central opening with an inner wall, the center of said opening coinciding with its center of symmetry;
   (B) a shaft extending through the center of symmetry of said engine; said center of symmetry being not coincident with said center of symmetry of said piston;
   (C) a wheel having a given radius, the periphery of said wheel being adapted to roll over said inner wall, said wheel being carried by said shaft;
   (D) three cylinders in contact with the periphery of said piston, the centers of said cylinders coinciding with the apices of the equilateral triangle having its center at the center of symmetry of said engine while said piston performs a wobbly rotary movement in constant contact with said cylinders, the center of said piston revolving around its center and around the center of symmetry of said engine, the spacing between the center of said piston and the center of symmetry of said engine varying periodically by a distance defined by the relationships $(e+x)$ and $(e-x)$ where $e$ is the average spacing between the center of symmetry of the engine and the center of symmetry of the piston; the periphery of said piston being in contact through the apex of one of its two arcuate sections with one of said cylinders and through two points of its other arcuate sections with said other two cylinders there always being a point on one of the arcuate sections contacting one cylinder and one point of the other arcuate section contacting another cylinder, the curves defining the lateral sections of the periphery of said piston and interconnecting the ends of said arcuate sections being so shaped as to differ from a true straight line in a form such that the third cylinder is constantly in contact with a point on said curves;

(E) the inner periphery of the wall of said piston differing by the above given distance from a true cylindrical surface in order to take into account the difference between the rotary movement of the center of the piston and a true circular path;

(F) the inner periphery of said engine chamber being defined by three similar arcs of a circle, each of said arcs being broken off to form a section; each of said arcs being limited by two of said cylinders and corresponding to the said arcuate section of said piston so as to form therewith and with two of said cylinders three elementary chambers;

(G) each of said arcs defining an elementary chamber having a recess located asymmetrically with respect to the apex defining the elementary chamber; said recess serving as an ignition chamber;

(H) means feeding in succession fluid into and out of said elementary chambers.

2. An engine as claimed in claim 1, wherein the diameter of said piston opening in the longitudinal direction of said piston is equal to $2(r+e+x)$, wherein $e$ and $x$ are as previously defined and $r$ is the pitch radius of said wheel, and in the direction transverse to said piston is equal to $2(r+e-x)$ and along diagonals at 45° is equal to $2(r+e)$.

3. An engine as claimed in claim 1, wherein the value "$x$" is equal to $0.016e$ where $e$ is as defined in said claim.

4. An engine as claimed in claim 1 wherein the diameter of said wheel is greater than the average radius $(e+r)$ of said central opening of said piston.

5. An engine as claimed in claim 1, wherein said wheel and the inner peripheral surface of said piston opening have teeth adapted to enmesh.

6. An engine as claimed in claim 1, wherein said wheel and said piston opening are in rolling frictional contact.

7. An engine as claimed in claim 1, wherein a wall limiting an ignition chamber is formed by a section extending substantially in a direction tangent to the arc defining the corresponding elementary chamber and by a section extending in a substantially perpendicular direction with reference to said arc and a larger volume of said ignition chamber lies to one side of the apex of the arc defining the elementary chamber.

8. An engine as claimed in claim 1, having admission and exhaust valves controlled by a member mounted on said shaft.

9. An engine as claimed in claim 1, having rotary admission and exhaust valves operated through speed-reducing gear by a toothed wheel mounted on said shaft.

10. An engine as claimed in claim 1, having admission and exhaust valves controlled by a cam disc carried by said shaft and rocking through a small angle around axes extending parallel to said shaft.

11. A rotary piston engine having a stator and comprising:

(A) an elongated piston of a shape defined by two mutually facing arcuate sections and having a given radius; said piston being provided by a central opening the centre of said opening coinciding with the centre of symmetry of said piston;

(B) a wheel carried by a shaft extending through the centre of symmetry of said engine, the centres of symmetry of said piston and of said engine being non-coincident;

(C) three cylinders in contact with the periphery of said piston and having a given radius, the centres of said cylinders coinciding with the apices of an equilateral triangle having its centre at the centre of symmetry of said engine while said piston performs a wobbly rotary movement in constant contact with said cylinders;

(D) said piston rotating around its centre of symmetry and simultaneously around the axis of symmetry of said engine at a distance therefrom varying periodically from $(e+x)$ and $(e-x)$, $e$ being the average distance between said centre of symmetry of said machine and the centre of symmetry of said piston; there being three positions for which the longitudinal axis of said piston coincides with one of the lines bisecting said triangle, the periphery of said piston being in contact through the apex of one of its two arcuate sections with one cylinder and through two points of its other arcuate section with the other two cylinders, there always being a point on one of said arcuate sections in contact with one of said cylinders and another point on the other arcuate section in contact with another cylinder;

(E) the lateral sections of the periphery of said piston being defined by curves interconnecting the ends of said two arcuate sections, said curves being so shaped as to differ from a true straight line such that said third cylinder is constantly in contact with a point on said curves.

12. A rotary piston machine according to claim 11 wherein two units as defined in claim 11 operate on a common shaft, the longitudinal axes of the rotary pistons being perpendicular to each other.

References Cited by the Examiner

UNITED STATES PATENTS

| 724,665 | 4/1903 | Cooley | 103—126 |
| 748,348 | 12/1903 | Cooley | 91—68 |
| 914,627 | 3/1909 | Alcorn | 123—8 |
| 3,108,578 | 10/1963 | Scherenberg | 230—145 |
| 3,117,561 | 1/1964 | Bonavera | 123—8 |
| 3,221,664 | 12/1965 | Jernaes | 103—130 |
| 3,246,835 | 4/1966 | Linder | 230—145 |

FOREIGN PATENTS

| 25,247 | 1909 | Great Britain. |
| 961,872 | 6/1964 | Great Britain. |
| 964,083 | 7/1964 | Great Britain. |

MARK NEWMAN, *Primary Examiner.*

W. J. GOODLIN, *Assistant Examiner.*